(12) United States Patent
Takamatsu et al.

(10) Patent No.: US 8,403,273 B2
(45) Date of Patent: Mar. 26, 2013

(54) L-CHARACTER STAND

(75) Inventors: Mutsumi Takamatsu, Tokyo (JP); Takeshi Suzuki, Tokyo (JP); Hiromasa Miyamoto, Chiba (JP); Masahiko Horiuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 629 days.

(21) Appl. No.: 12/229,804

(22) Filed: Aug. 27, 2008

(65) Prior Publication Data
US 2009/0057502 A1 Mar. 5, 2009

(30) Foreign Application Priority Data
Aug. 28, 2007 (JP) ................................. 2007-221451

(51) Int. Cl.
*A47F 5/00* (2006.01)

(52) U.S. Cl. ...................... 248/122.1; 248/158; 248/918; 361/679.04

(58) Field of Classification Search .................. 248/121, 248/122.1, 176.1, 917–924, 676, 158, 159, 248/163.1; 52/29; 361/679.04
See application file for complete search history.

(56) References Cited

U.S. PATENT DOCUMENTS

| | | | | |
|---|---|---|---|---|
| 2,236,133 A * | 3/1941 | Croninger et al. | ......... | 248/442.2 |
| 3,142,813 A * | 7/1964 | Matulis | ......... | 338/201 |
| 3,347,509 A * | 10/1967 | Blink et al. | ......... | 248/188.7 |
| 3,866,872 A * | 2/1975 | Burgess | ......... | 248/97 |
| 5,014,961 A * | 5/1991 | Ferguson | ......... | 248/670 |
| RE36,978 E * | 12/2000 | Moscovitch | ......... | 248/122.1 |
| 6,343,006 B1 * | 1/2002 | Moscovitch et al. | ..... | 361/679.04 |
| 6,921,057 B2 * | 7/2005 | Chen et al. | ......... | 248/349.1 |
| 7,150,440 B2 * | 12/2006 | Yuan | ......... | 248/372.1 |
| 7,213,792 B2 * | 5/2007 | Choi | ......... | 248/279.1 |
| 7,255,355 B2 * | 8/2007 | Chisholm et al. | ......... | 280/30 |
| 7,357,399 B1 * | 4/2008 | Klotz | ......... | 280/79.11 |
| 7,564,679 B2 * | 7/2009 | Chen et al. | ......... | 361/679.21 |
| 7,611,118 B2 * | 11/2009 | O'Neill | ......... | 248/551 |
| 7,793,897 B2 * | 9/2010 | Wang et al. | ......... | 248/125.2 |
| 2003/0132360 A1 * | 7/2003 | Ju | ......... | 248/371 |
| 2005/0230573 A1 * | 10/2005 | Ligertwood | ......... | 248/158 |
| 2005/0258334 A1 * | 11/2005 | Hwang et al. | ......... | 248/920 |
| 2007/0103856 A1 * | 5/2007 | She | ......... | 361/681 |
| 2007/0138356 A1 * | 6/2007 | Johansson et al. | ......... | 248/125.1 |
| 2007/0139870 A1 * | 6/2007 | Lin | ......... | 361/681 |
| 2007/0194182 A1 * | 8/2007 | Lee | ......... | 248/125.9 |

(Continued)

FOREIGN PATENT DOCUMENTS

| JP | 5-69780 | 9/1993 |
|---|---|---|
| JP | 07-104681 | 4/1995 |

(Continued)

*Primary Examiner* — Bradley Duckworth
(74) *Attorney, Agent, or Firm* — Wolf, Greenfield & Sacks, P.C.

(57) ABSTRACT

There is provided an L-character stand. The L-character stand is provided with columns supporting one electronic product; a base combined with the columns like an L-character; one fixture provided on the columns; and another fixture provided on the rear face of another electronic product, wherein the one fixture and the another one can be engaged with each other at a first position and at a second position, at assembly, another electronic product can be fixed to the column by engaging at the first position, and, at wiring between one electronic product and another one, the products can be fixed by engaging them at the second position in a state in which the rear face of the another electronic product is turned upward.

8 Claims, 15 Drawing Sheets

U.S. PATENT DOCUMENTS

| | | | |
|---|---|---|---|
| 2007/0279850 A1* | 12/2007 | Chiang et al. | 361/681 |
| 2008/0006744 A1* | 1/2008 | Sun | 248/161 |
| 2008/0117574 A1* | 5/2008 | Lee | 361/681 |
| 2008/0192417 A1* | 8/2008 | Hwang et al. | 361/681 |
| 2010/0006715 A1* | 1/2010 | Wills et al. | 248/121 |
| 2010/0155546 A1* | 6/2010 | Lien et al. | 248/121 |
| 2010/0213328 A1* | 8/2010 | Smith et al. | 248/122.1 |
| 2011/0011990 A1* | 1/2011 | Tsai et al. | 248/122.1 |

FOREIGN PATENT DOCUMENTS

| | | |
|---|---|---|
| JP | 07-319402 | 12/1995 |
| JP | 2004-226791 A | 8/2004 |
| JP | 2006-340029 A | 12/2006 |
| JP | 2007-027873 A | 2/2007 |
| JP | 2007-027928 | 2/2007 |
| JP | 2007-108528 A | 4/2007 |

* cited by examiner

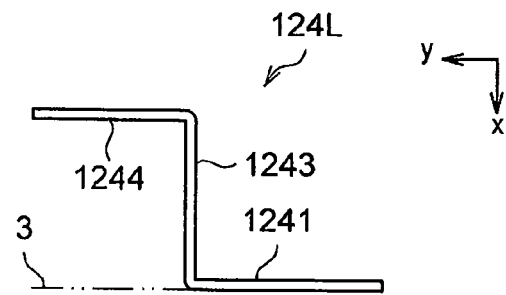
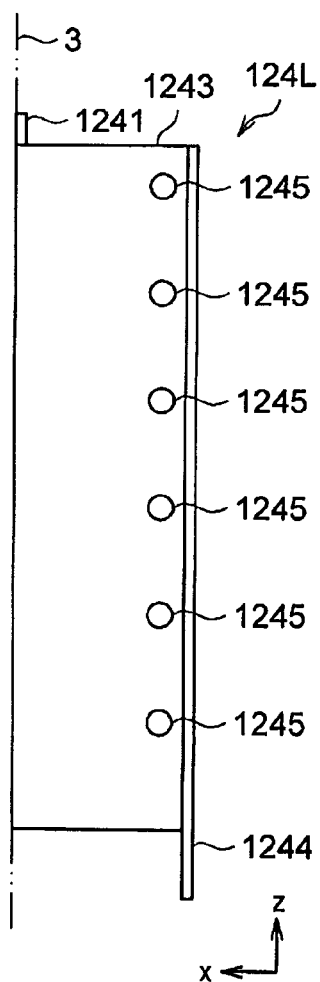 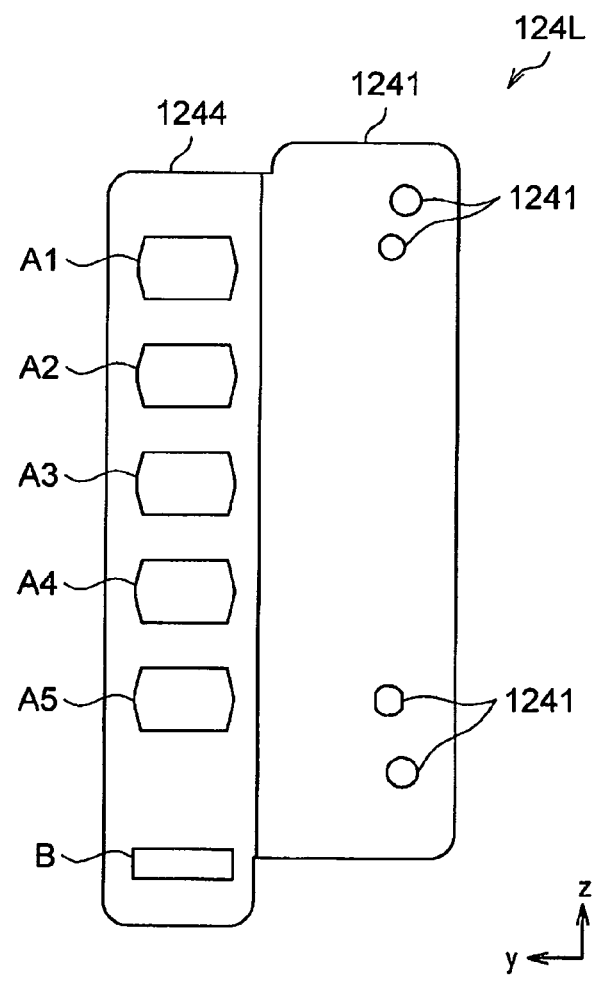

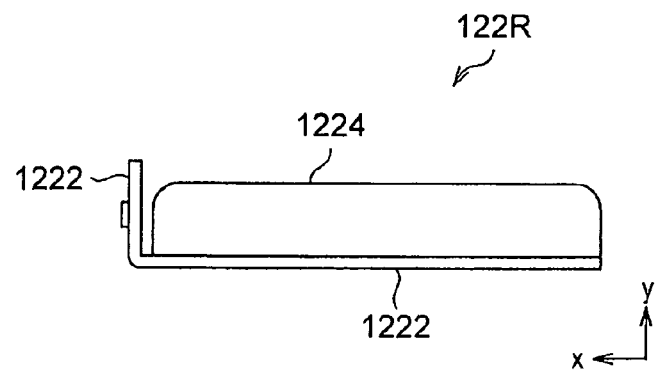
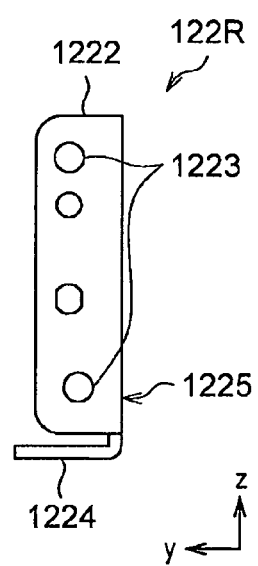
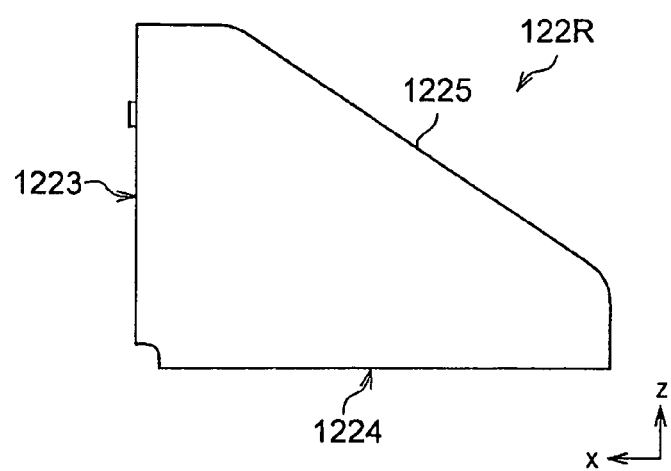

L-CHARACTER STAND

CROSS REFERENCES TO RELATED APPLICATIONS

The present invention contains subject matter related to Japanese Patent Application JP 2007-221451 filed in the Japan Patent Office on Aug. 28, 2007, the entire contents of which being incorporated herein by reference.

BACKGROUND OF THE INVENTION

1. Field of the Invention

The present invention relates to an L-character stand.

2. Description of the Related Art

Recently, with the advent of a flat-plate display device such as liquid crystal display device and an organic electro-luminescence display device, there has been a home theater system in which images and sounds are enjoyed by images on a large screen and high quality sound. This home theater system includes, for example, a large-sized flat-plate display device, and a plurality of speakers for 5.1 ch and 7.1 ch surround sound systems, and the size of the system has been enlarged. As a large-sized device has larger portion in the arrangement space, and the atmosphere in the arrangement space is influenced by the device, the arrangement position becomes important.

Then, there has been developed an fixture with which a device disclosed in Japanese Patent Application Laid-Open (JP-A) No. 2007-108528 is arranged fixed to a wall, and a stand which can support a plurality of electronic products disclosed in JP-A No. 2007-27873 in order to improve the influence of the arrangement position and the arrangement space of the above device on the atmosphere.

SUMMARY OF THE INVENTION

However, a fixture for an electronic product described in a reference 1 may require a mounting operation by which the fixture is mounted onto a wall, and, when the product is arranged once, it has been difficult to move the product. Moreover, as a wiring connector of an electronic product and the like approaches the side of a wall, it has been also difficult to change the wiring. First, the fixture of an electronic product which is fixed to a wall has had more reduced arrangement freedom degree.

On the other hand, though, according to a stand described in a cited reference 2, a freedom degree in an arrangement position is increased, there may be required a certain degree of area in the back and forth direction of a bottom surface of the stand so that the stand may become independent. Therefore, the area and the size of the entire stand are noticeable, and there is a restriction in moving a supporting electronic product to a wall. Accordingly, there has been a case in which the atmosphere in the arrangement space is occasionally impaired. Moreover, the above stand can support a plurality of electronic products. However, as the connector of an electronic product is often arranged backward or downward, it may be required in wiring to pass around behind the stand, or to move the stand itself.

Thus, the atmosphere of the arrangement space is occasionally impaired according to a method according to a related technology in which an electronic product is arranged. Moreover, there has been a room for further improvement in the maintainability, for example, in wiring, moving, and the like in, or after arrangement.

Then, the present invention has been made, considering the above-described issue, and it is desirable to arrange an electronic product in harmony with the arrangement space and to improve the maintainability of the electronic product.

According to an embodiment of the present invention, there is provided an L-character stand, in which, a column supporting one electronic product, a base which is combined with the column like an L-character, one fixture provided to the column, and another fixture provided on the rear face of another electronic product are provided; the one fixture and the other one can be engaged with each other at a first position and a second one; at assembly, another electronic product can be fixed to the column by engaging them at a first position; and at wiring between the one and the other electric products, the rear face of another electronic product can be fixed in a turning-up state by engaging at a second position.

According to the above configuration, using one fixture and the other fixture, another electronic product can be fixed to the column at assembly, and, at wiring, the rear face of another electronic product can be fixed to the column in a state in which the rear face is turned up. Accordingly, access to the rear face and the undersurface of another electronic product becomes easy.

Moreover, there may be a configuration in which any one of the one, or the other fixture is provided with a hook, and any one of the other one is provided with a hole for wiring with which the hole for wiring can engage.

Moreover, there may be provided with a configuration in which there is further provided with a front cover covering at least the front face and the right and left side faces of the column, and, on the front cover, there may be opened a wiring hole, through which at least one fixture can be exposed.

According to another embodiment of the present invention, there is provided an L-character stand which includes a column supporting an electronic product, and a base which is combined with the column like an L-character, and in which, on the base, there is detachably provided with a base cover covering at least the top face, the front face, and the right and left side faces, and there is provided an L-character stand with an wiring hole on the side face of the base cover.

According to the above configuration, the base can be covered by the base cover. Moreover, by the wiring hole provided on the side face of the base cover, wiring passing the inside of the base cover can be lead to the side of the base cover, and the wiring passing the side of the base cover can be lead into the inside of the base cover. Accordingly, the wiring can be arranged in order.

Moreover, the base cover may be slidably provided to the base in the back and forth direction.

Moreover, there may be provided a configuration in which there is provided a front cover which covers at least the front face and the right and left side faces of the column, and is in contact with the base cover at assembly, and there is also provided an opening for a hole for wiring is provided at least on the top face of a base cover, or the front face of a front cover at the contact portion between the base cover and the front cover.

According to another embodiment of the present invention, there is provided an L-character stand in order to solve the above-described issue, and the stand is provided with a column supporting an electronic product, and a base which is combined with the column like an L-character in such a way that there is not provided an projecting portion on the rear face. Furthermore, the L-character stand is provided with leg portions which can project backward of the column in a lower end portion of the column according to a provided position.

As the L-character stand can be prevented, by the leg portion, from falling backward according to this configuration, it becomes easier to access the rear face of the L-character stand. Moreover, as the base and the like do not have the projecting portion, the L-character stand can be arranged nearer to the wall surface.

Moreover, the leg portion may be detachable.

According to another embodiment of the present invention, there is provided an L-character stand, which is provided with a column supporting an electronic product, a base which is combined with the column like an L-character, and a connecting tool which connects the column and the base, and in which the connecting tool is made by integral molding of a vertical portion connected with the column and a horizontal portion connected with the base.

As the vertical portion and the horizontal portion of the connecting tool are made by integral molding according to the above configuration, the strength between the column and the base can be improved.

According to the embodiments of the present invention described above, an electronic product can be arranged in harmony with the arrangement space, and the maintenance of an electronic product can be improved.

BRIEF DESCRIPTION OF THE DRAWINGS

FIG. 5A is an exemplary view for explaining a fixture on the side of a speaker system in the speaker system supporting mechanism according to the embodiment;

FIG. 5B is an exemplary view for explaining a fixture on the side of a speaker system in the speaker system supporting mechanism according to the embodiment;

FIG. 5C is an exemplary view for explaining a fixture on the side of a speaker system in the speaker system supporting mechanism according to the embodiment;

FIG. 10A is an exemplary view for explaining a leg portion according to the embodiment;

FIG. 10B is an exemplary view for explaining a leg portion according to the embodiment;

FIG. 10C is an exemplary view for explaining a leg portion according to the embodiment;

DETAILED DESCRIPTION OF THE PREFERRED EMBODIMENTS

Figure 1:
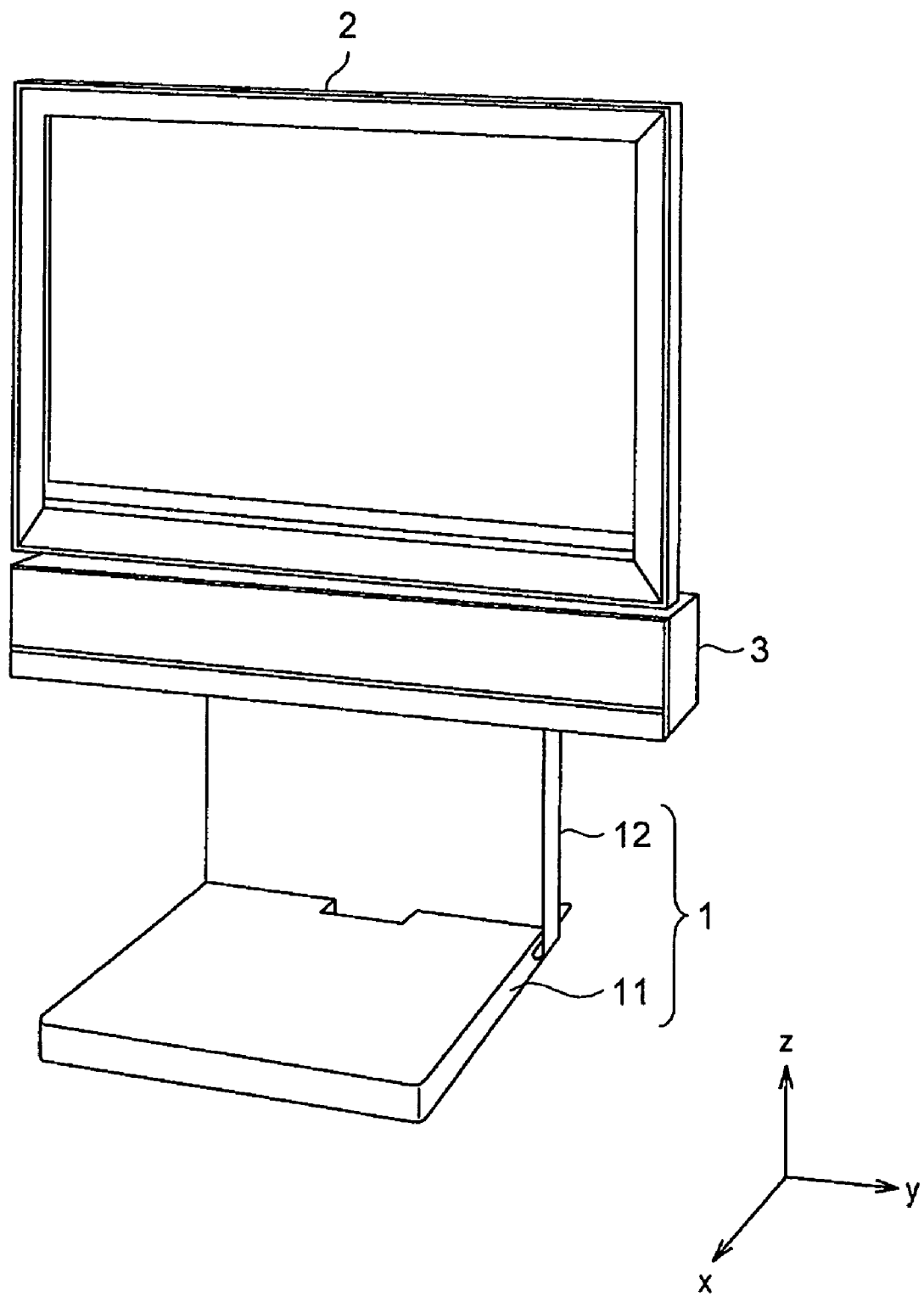
FIG. 1 is an exemplary view for explaining an L-character stand according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is an exemplary view for explaining the L-character stand according to the first embodiment of the present invention. As shown in FIG. 1, the L-character stand 1 according to the present embodiment can support a plurality of electronic products.

In the following, there will be explained, for convenience of explanation, a case in which an L-character stand 1, as one electronic product, supports a flat-plate display device 2 such as a liquid crystal display device and an organic electric field luminescence display device, and, moreover, supports a speaker system 3 as another electronic product. Moreover, the flat-plate display device 2 and the speaker system 3 forms the home theater system. However, an electronic product which the L-character stand 1 according to the present embodiment can support is not limited to the above example, but, a variety of electronic products such as a video deck and an HDD recorder amplifier tuner can be supported. Moreover, the number of the electronic products which can be supported is not limited to two.

The L-character stand 1 is formed with a base 11 and a column portion 12. The base 11 is put on the floor face, and the load of a supported electronic product, and the own load of the L-character stand 1 is transmitted to the floor face. The column portion 12 transmits the load of the supported electronic product to the base 11. This base 11 and the column portion 12 are connected with each other in the shape of the approximate letter L when seeing from the horizontal direction (y-axis direction).

In the following, the positive direction of the X axis, that is, the direction to a point at which a user is located, when the user faces the home theater system supported by the L-character stand 1, is also called "forward", or "front". Moreover, the negative direction of the x-axis, that is, the direction to the back face (rear face) of the home theater system is also called "backward" and "rear face". Furthermore, a direction to both sides of the y axis direction of the home theater system, that is, a direction to the side is also called "horizontal direction", or "right and left direction", the positive direction of the Y axis is called "right", and the negative direction of the Y axis is called "left". That is, each of the right and left directions corresponds to the right and the left of a user when the user faces the home theater system.

Figure 2:
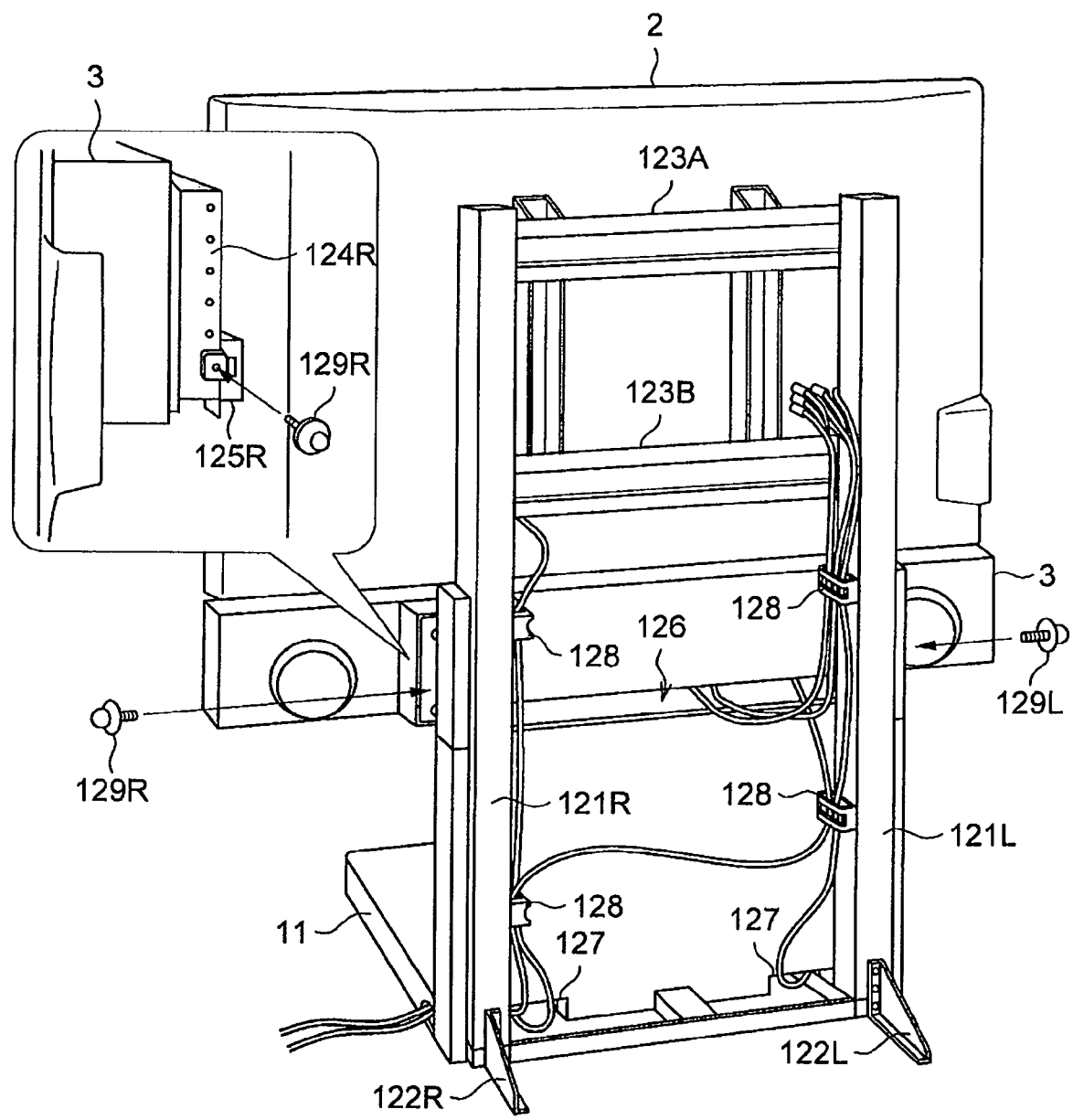
FIG. 2 is an exemplary view for explaining the L-character stand according to the embodiment, seeing from the back.

FIG. 2 is an exemplary view for explaining the L-character stand according to the present embodiment, seeing from the back. As shown in FIG. 2, the column portion 12 has two columns 121L and 121R, a front cover 121F, and leg portions 122L, and 122R.

Two columns 121L and 121R forms a main structure supporting an electronic product, and the load of an electronic product is transmitted to the base 11 through the two columns 121L and 121R. Here, the number of the columns is not necessarily limited to two, and may be 1, 3, 4 or more.

The front cover 121F is arranged in such a way that the cover 121F covers at least the front face and the right and left side faces of the columns 121L and 121R forward of the columns 121L and 121R. This front cover 121F protects the columns 121L and 121R, and, at the same time, takes a role of a make-up board which prevents wiring, and the columns 121L, and 121R from being exposed.

The leg portion 122L is arranged in a state in which the portion 122L projects backward of the column 121L, and the leg portion 122R is arranged in a state in which the portion 122R is projecting backward of the column 121R. Moreover, as the base 11 is connected to the forward of these columns 121L and 121R, the L-character stand 1 is prevented from falling forward by the base 11, and, on the other hand, the L-character stand 1 is prevented by the leg portions 122L and 122R from falling backward. Moreover, these leg portions 122L and 122R are detachably arranged unlike a stand of a related technology, and the L-character stand 1 can be arranged nearer to the wall by detaching the leg portions 122L and 122R. These leg portions 122L and 122R will be described later in detail.

Moreover, as shown in FIG. 2, beams 123A 123B are arranged between the columns 121L and 121R in the upper portion of the L-character stand 1.

The beams 123A and 123B reinforce the strength of the L-character stand by connecting both of the one ends of the beams to the column 121L, and both of the other ends to the column 121R in the upper potion of the L-character stand 1, respectively. Moreover, the rear face of the flat-plate display device 2 is connected to the beams 123A and 123B. Thereby, the beams 123A and 123B support the flat-plate display device 2.

Figure 3:
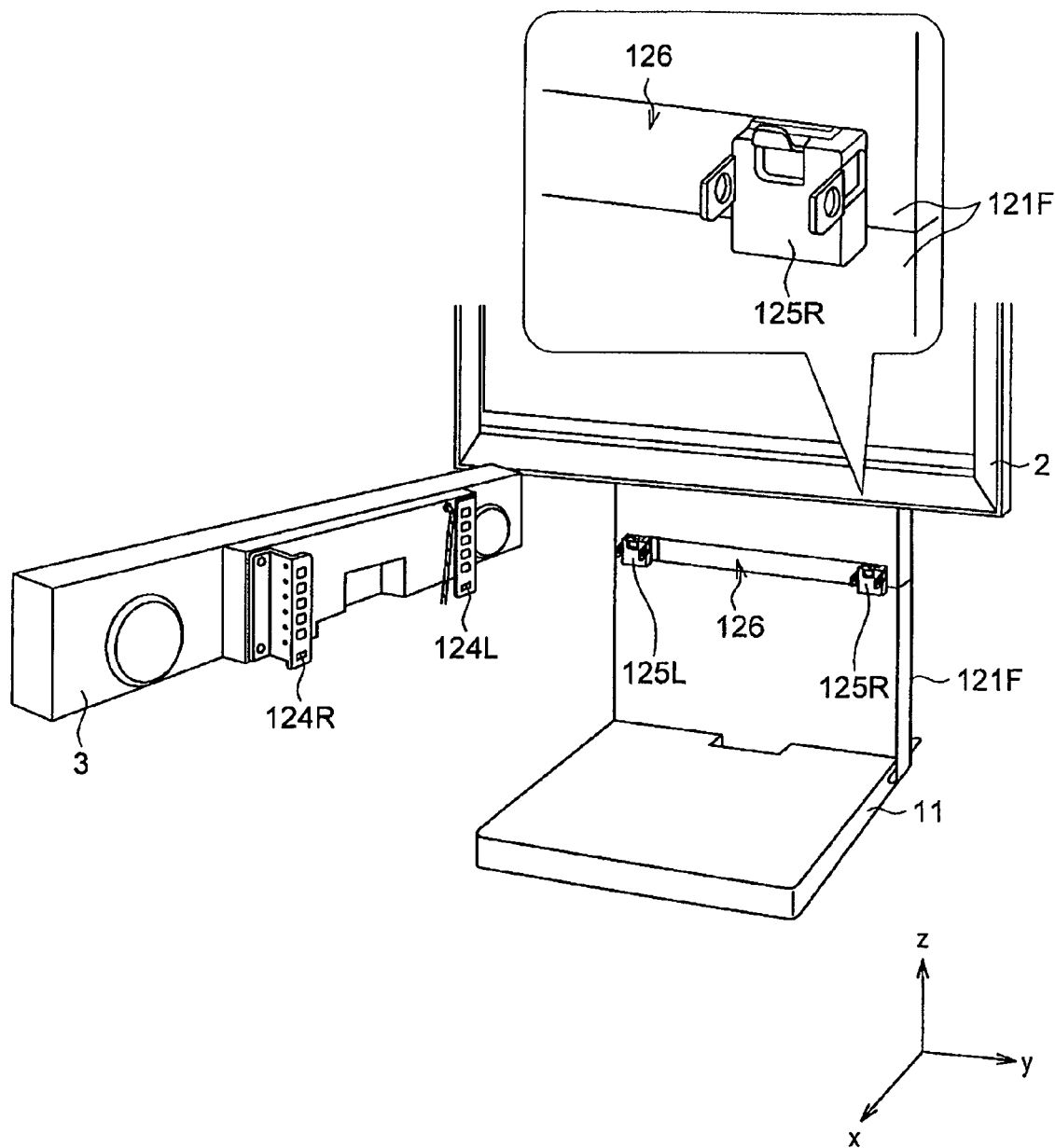
FIG. 3 is an exemplary view for explaining a speaker system supporting mechanism of the L-character stand according to the embodiment.

The speaker system 3 is supported underneath the flat-plate display device 2. This support mechanism will be explained. FIG. 3 is an exemplary view for explaining the speaker system supporting mechanism of the L-character stand according to the present embodiment.

This support mechanism has two kinds of fixtures 124L and 124R, and fixtures 125L and 125R, as shown in FIG. 3, and screws 129L and 129R as shown in FIG. 2.

The fixtures 124L and 124R are mounted on the rear face of the speaker system 3, and the fixtures 125L and 125R are mounted on the column 121L and the column 121R on the front face of the column portion 12, respectively. Moreover, a wiring hole 126 for wiring is formed on the front cover 121F, and the fixtures 125L and 125R are exposed to the forward through the wiring hole 126. Then, the speaker system 3 is supported for fixing by a configuration in which the fixtures 124L and 124R are engaged with the fixtures 125L and 129R, respectively, the screw 129L is inserted into holes formed on the fixtures 124L, and 125L, and the screw 129R is inserted into holes formed on the fixtures 124R, and 125R. In this case, the front face of the speaker system 3 is fixed toward the front face of the L-character stand 1, that is, toward a direction to a user.

Figure 4C:
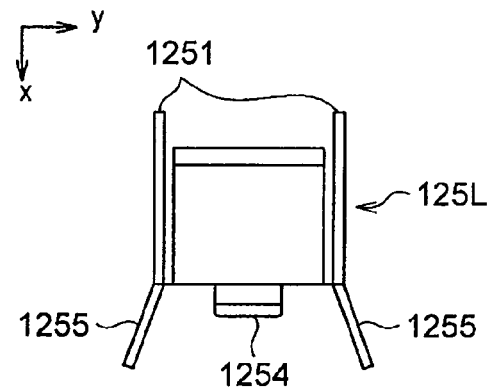
FIG. 4C is an exemplary view for explaining a fixture on the side of the column in the speaker system supporting mechanism according to the embodiment.
Figure 4B:
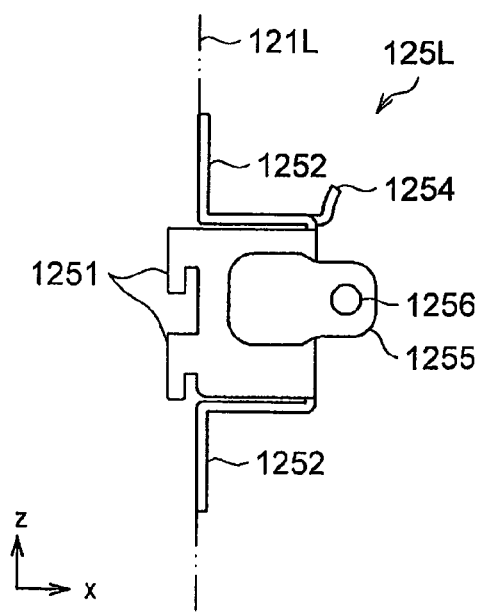
FIG. 4B is an exemplary view for explaining a fixture on the side of the column in the speaker system supporting mechanism according to the embodiment.
Figure 4A:
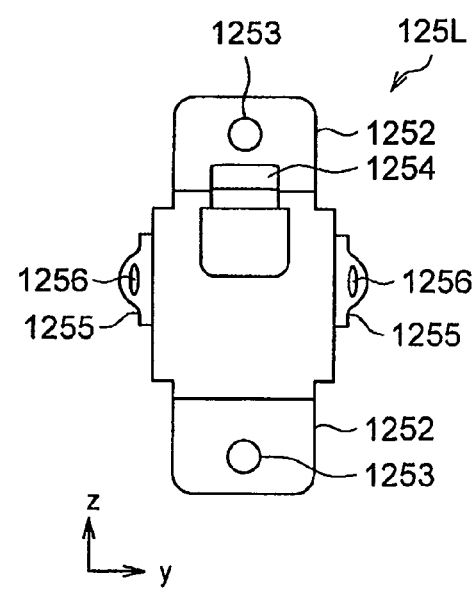
FIG. 4A is an exemplary view for explaining a fixture on the side of the column in the speaker system supporting mechanism according to the embodiment.

The fixtures 124L, 124R, 125L, and 125R will be explained. Here, as the fixtures 124R, and 125R are symmetrically formed with respect to the fixture 124L and the fixture 125L, respectively, the fixture 124L and the fixture 125L will be explained. FIG. 4 is an exemplary view for explaining a fixture on the side of the column in the speaker system supporting mechanism according to the embodiment. Moreover, FIG. 4A, FIG. 4B, and FIG. 4C are a front view, a side view, and a top view of a fixture 125L connected to the column 121L, respectively.

As shown in FIG. 4, a hook 1251 and a support plate 1252 are formed in the direction of the rear face (direction of the column 121L) of the fixture 125L (one fixture).

The hook 1251 is formed like an L-character, in which the point is directed downward, and engages with a hole (not shown) formed on the front face of the column 121L. The support plate 1252 is in contact with the front face of the column 121L, and is screwed between a hole 1253 of the support plate 1252 and a hole (not shown) on the front face of the column 121L. Accordingly, the load of the speaker system 3 supported by the fixture 124L is transmitted to the column 121L by the hook 1251 and a screw (not shown) inserted into the support plate 1252.

On the other hand, as shown in FIG. 4 the hook 1254 and the guide board 1255 are formed in the direction (direction to the speaker system 3) to the front face of the fixture 125L.

The hook 1254 is formed like the L-character with the point pointing upward, and engages with a hole formed in the later-described fixture 125L. The guide boards 1255 are formed by being extended forward from the right and left sides of the fixture 125L, and the interval between the guide boards 1255 on the right and left sides is expanded toward the front side thereof. Moreover, on this guide board 1255, there is formed a hole 1256 which penetrates in the right and left direction.

FIG. 5 is an exemplary view for explaining the fixture on the side of the speaker system in the speaker system supporting mechanism according to the present embodiment. FIG. 5A, FIG. 5B, and FIG. 5C are a rear view, a side view, and a bottom view of the fixture 124L which is connected to the speaker system 3, respectively.

As shown in FIG. 5, a support plate 1241 is formed in the front direction (a direction of the speaker system 3) of the fixture 124L (another fixture), and, on this support plate 1241, there are formed a plurality of through holes 1242 in the back and forth direction.

A hole (not shown) formed in the speaker system 3, and a through hole 1242 are screwed to fix the support plate 1241 to the rear face of the speaker system 3 in contact with the rear face of the speaker system 3. That is, the fixture 124L is fixed to the rear face of the speaker system 3 through the support plate 1241 as shown in FIG. 3.

Moreover, as shown in FIG. 5C, a connecting plate 1243 is extended and formed at one end of this support plate 1241 in the longitudinal direction, projecting in the rear face direction (direction of the column 121L). Then, a support plate 1244 is extended and formed in parallel with the support plate 1241 in an end portion in the rear face direction of the connecting plate 1243.

The connecting plate 1243 connects the support plate 1241 and the support plate 1244, which are arranged in parallel with each other. Moreover, on the connecting plate 1243, there are formed a plurality of holes 1245 which are penetrating in the right and left direction, as shown in FIG. 5B. In a state in which the fixture 124L and the fixture 125L are engaged with each other, the screws 129L shown in FIG. 2 are inserted into these plurality of holes 1245 through the hole 1256 of the fixture 125L shown in FIG. 4. As a result, the engaged state between the fixture 124L and the fixture 125L is fixed.

A plurality of holes A1 to A5, and B, which have a width corresponding to the width of the hook 1254, and are penetrating in the back and forth direction, as shown in FIG. 4, are vertically arranged on the support plate 1244.

The hook 1254 of the fixture 125L is inserted into the holes A1 to A5, and B of this fixture 124L, and, by engaging of the both, the speaker system 3 is fixed to the column 121L.

By engaging the hook 1254 into any one of holes A1 to A5, the front face of the speaker system 3 can be arranged toward the forward direction of the L-character stand 1 for fixing, as shown in FIG. 1 and FIG. 2. Here, the arrangement position of this speaker system 3 is called a first position. That is, this first position is a set position at which the speaker system 3 is set in such a way that the home theater system can be used. Moreover, the height of the speaker system 3 can be adjusted by selecting a hole, with which the hook 1254 is engaged, from any of the holes A1 to A5.

Figure 6:
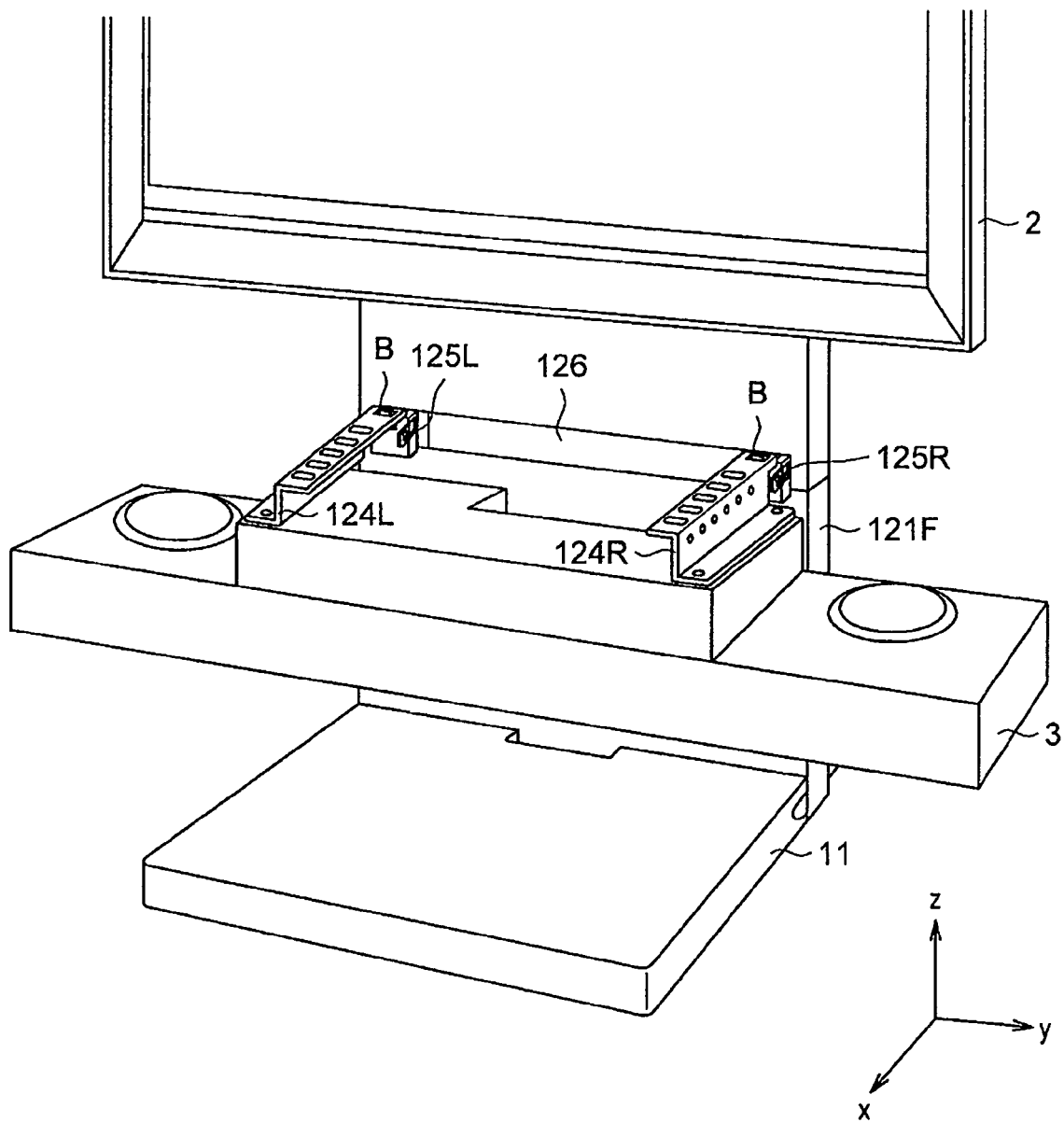
FIG. 6 is an exemplary view for explaining a fixture of the speaker system supporting mechanism according to the embodiment.

On the other hand, by pushing the speaker system 3 down forward in order to direct the rear face of the speaker system 3 upward, and by engaging the hook 1254 into the hole B, the rear face of the speaker system 3 can be arranged toward the upward of the L-character stand 1 for fixing as shown in FIG. 6. This arrangement position of the speaker system 3 is called a second position here. By setting the speaker system 3 at this second position, access to the rear face and the undersurface of the speaker system 3 becomes easy at maintenance. In other words, this second position is a maintenance position.

That is, for example, when the speaker system 3 is mounted, or maintained, a user can engage the hook 1254 with a hole B once to fix the speaker system 3 at the second position shown in FIG. 6. Therefore, according to this L-character stand 1, access to the rear face and the undersurface of the speaker system 3 becomes easy to cause easier wiring and adjustment, and to improve the maintainability.

Then, after wiring and the like, a user can relieve the engagement between the hole B and the hook 1254, and can engage the hook 1254 with any one of the holes A1 to A5 by directing the front face of the speaker system 3 to the front, and then, the speaker system 3 can be fixed at the first position. Moreover, in this case, the guide board 1255 shown in FIG. 4 is formed to the fixture 124L, and this guide board 1255 guides the support plate 1244 in the fixture 124L to the fixture 125L. Accordingly, there can be easily performed positioning between the holes A1 to A5 and the hook 1254 in the right and left directions.

Figure 7:
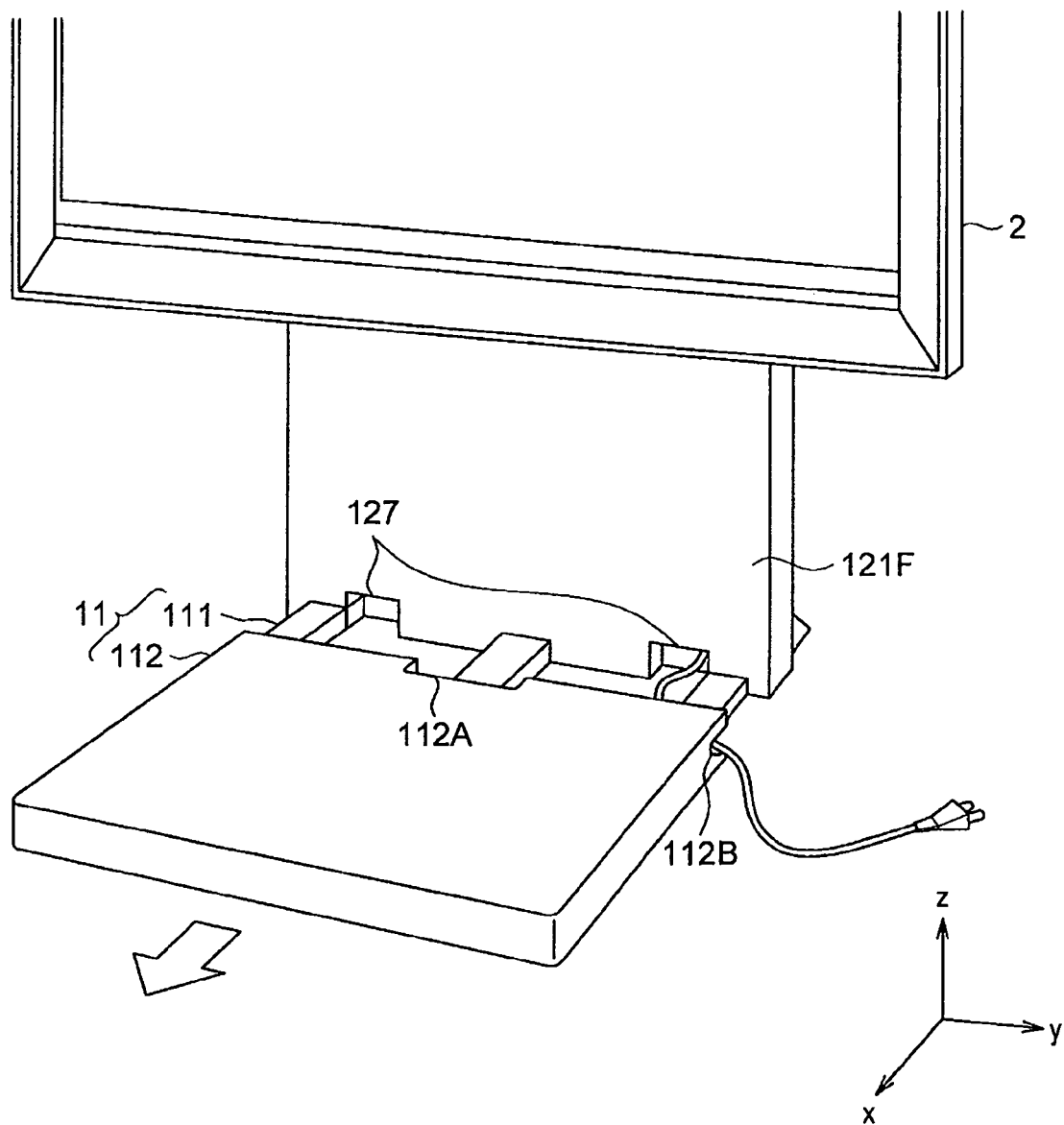
FIG. 7 is an exemplary view for explaining a base, and a front cover according to the embodiment.

Moreover, the above L-character stand 1 further has the configuration for improving the maintainability in the base 11 and the front cover 121F. Then, the base 11 and the front cover 121F will be explained. FIG. 7 is an exemplary view for explaining a base and a front cover according to the present embodiment.

As shown in FIG. 7, the base 11 has a base 111 and a base cover 112. The base cover 112 covers at least the top face, the front face, and a right and left side faces of the base 111, protects the base 111, and takes a role of a make-up board which prevents the base 111, wiring and the like from being exposed to the outside. Then, other electronic products such as a video deck, an HDD recorder, and a game machine can be mounted on the base cover 112. Moreover, the base cover 112 is opened downward and backward, the base 111 can be formed to be inserted from backward into the above opened space. That is, the base cover 112 is slidably provided in the back and forth direction.

Moreover, a wiring hole 112A is formed on the top face of the end portion on the side of the front cover 121F of the base cover 112, and a wiring hole 112B is formed on a right and left face. Furthermore, wiring holes 127 are formed even at positions in contact with the base cover 112 at assembly in the bottom end on the front face of the front cover 121F.

Accordingly, as shown in FIG. 2 and FIG. 7, wiring like power supply codes and tuner codes in the flat-plate display device 2 is led downward behind the front cover 121F, and is led forward through the wiring holes 127. Then, the wiring, which is led forward from the wiring hole 127, passes through the inside of the base cover 112, and is led from the wiring hole 112B to the side, as shown in FIG. 7. Moreover, the wiring from the speaker system 3 is similarly led, as shown in FIG. 2, from the wiring hole 126 of the front cover 121F to the backward of the front cover 121F, and can be connected to the flat-plate display device 2 and the like. Accordingly, the wiring passing through the L-character stand 1 can be prevented from exposing to the outside.

Moreover, as code fixing members 128, which can bundle the wiring, are arranged on the columns 121L and 121R, the wiring passing behind the front cover 121F can be organized for arrangement.

Figure 8:
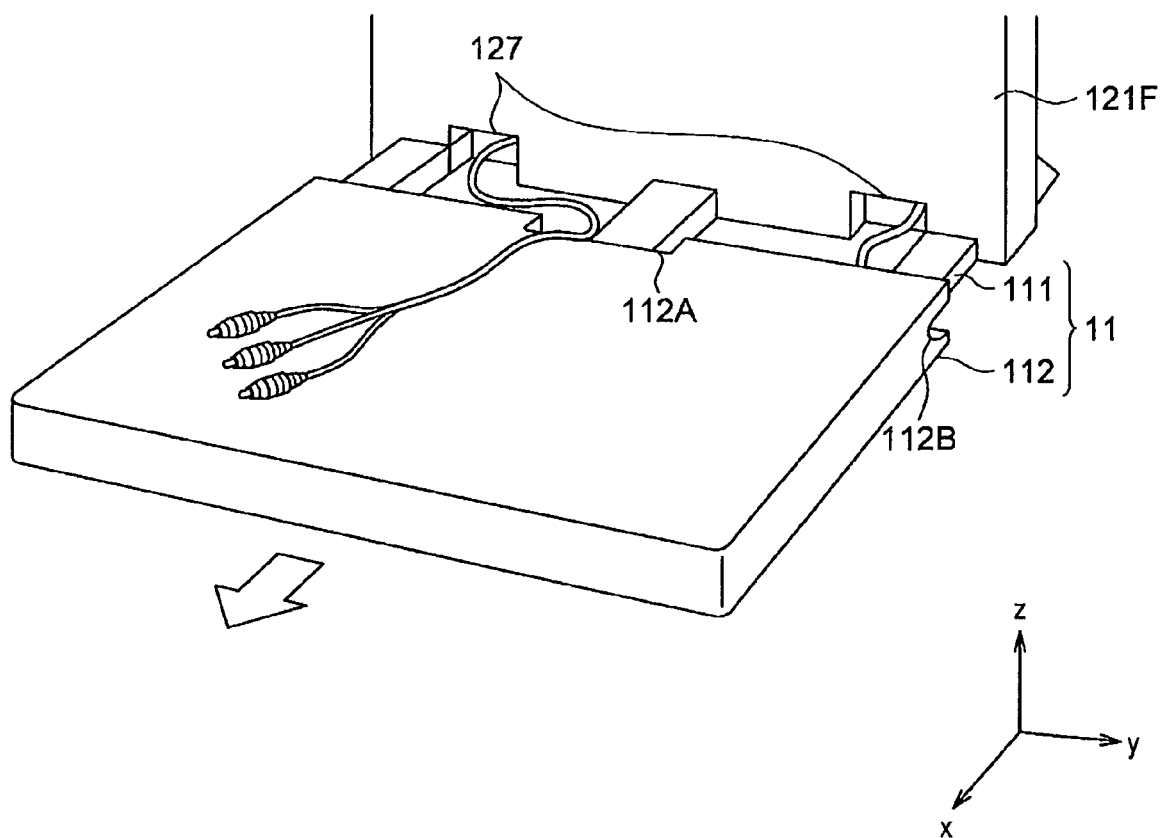
FIG. 8 is an exemplary view for explaining a base, and a front cover according to the embodiment.

Furthermore, there can be a configuration, as shown in FIG. 8, in which the wiring from the flat-plate display device 2, and the speaker system 3 passes behind the front cover 121F, is led forward through the wiring hole 127, and, furthermore, is lead to the upper portion of the base cover 112 through the lower portion of the base cover 112 and the wiring hole 112A. Accordingly, while the wiring between other electronic products mounted on the base cover 112 and the flat-plate display device 2 or speaker system 3 passes through the L-character stand 1, the wiring can be prevented from being exposed to the outside.

Thus, as the wiring and the like can be covered with the base cover 112 and the front cover 121F in the L-character stand 1, the L-character stand 1 can harmonize with the arrangement space. Moreover, the wiring can be prevented from being exposed to the outside, and further harmony with the arrangement space can be realized by the L-character stand 1, because there are formed the wiring holes 112A and 112B on the base cover 112, and the wiring holes 126, and 127 on the front cover 121F. Moreover, the maintainability can be improved, because the wiring can be separated, and arranged by the wiring holes 112A, 112B, 126, and 127, and the code fixing member 128.

Figure 9:
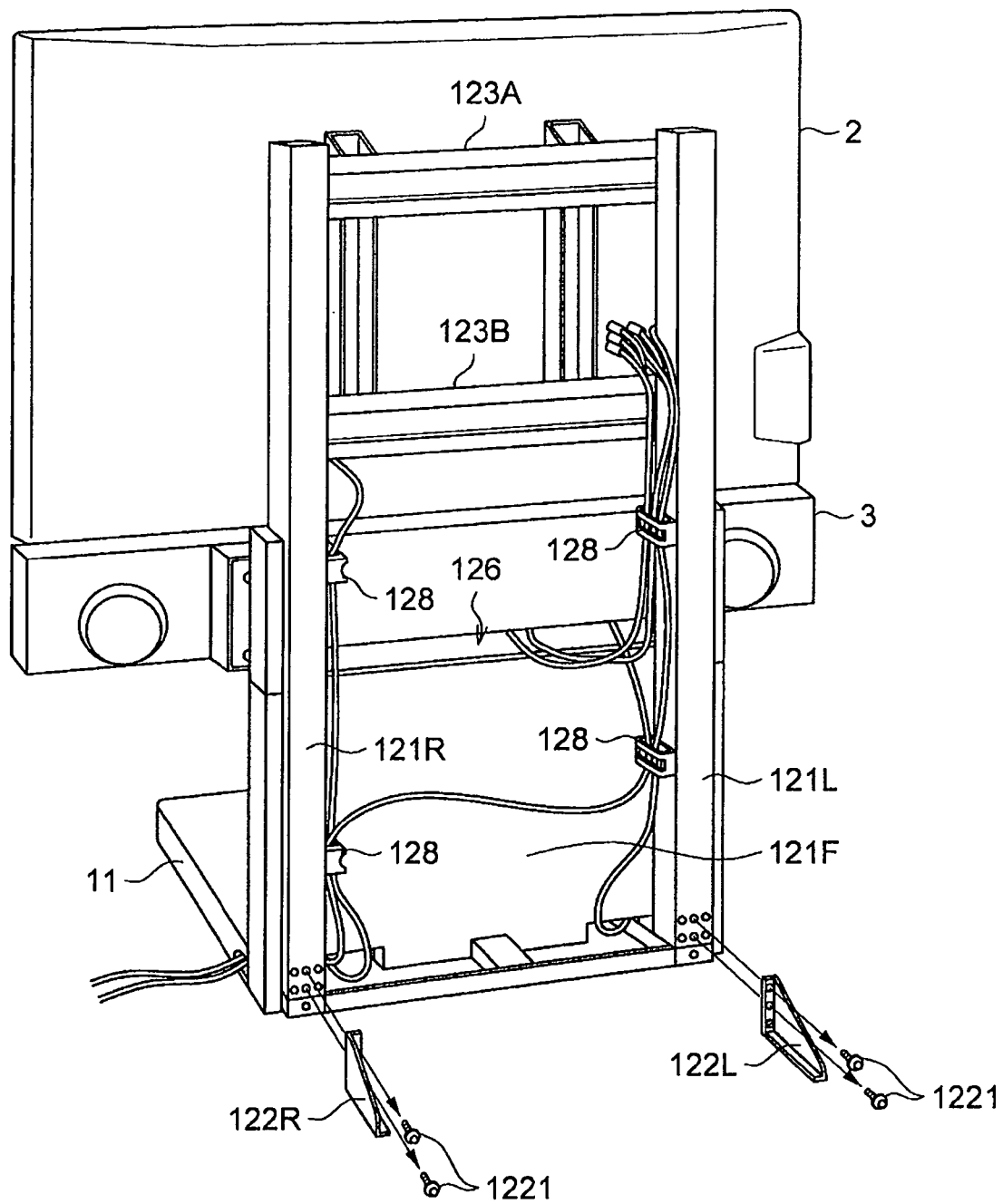
FIG. 9 is an exemplary view for explaining a leg portion according to the embodiment.

Moreover, the above L-character stand 1 has the leg portions 122L and 122R, as shown in FIG. 2. The load of the L-character stand 1 is transmitted to the floor face and the falling thereof is prevented by the base 11 arranged forward, and the leg portions 122L and 122R arranged backward. However, as shown in FIG. 9, the leg portions 122L and 122R can be detached in this L-character stand 1. That is, the leg portions 122L and 122R are fixed to the columns 121L and 121R with screws 1221 respectively, and the leg portions 122L and 122R can be removed by removing the screws 1221.

The structures of the leg portions 122L and 122R are shown in FIG. 10. Here, FIG. 10A, FIG. 10B, and FIG. 10C show a side view, a front view, and a top view of the leg portion 122R, respectively. The leg portion 122L is formed with left-right symmetry with the leg portion 122R, and explanation will be eliminated here.

The leg portion 122R has a connecting plate 1222 in the forward, and there is formed a hole 1223 penetrating in the back and forth direction on this connecting plate 1222. Then, the leg portion 122R is fixed to the column 121R by inserting the screws 1221 into the hole 1223 and a hole formed on the column 121R in a state in which the connecting plate 1222 is in contact with the rear face of the column 121R in the lower portion.

Moreover, the leg portion 122R has a support plate 1224 on the undersurface, and has a connecting plate 1225 between the support plate 1224 and the connecting plate 1222. Accordingly, the L-character stand 1 is supported so that the stand 1 does not fall because the load of the L-character stand 1, which is transmitted to the connecting plate 1222, is transmitted to the floor face through the connecting plate 1225 and the support plate 1224.

This leg portion 122R can be detached only by inserting, or removing of the screws 1221. Moreover, when the leg portions 122L and 122R are removed, there are not formed the projecting portions on the rear faces of the columns 121L and 121R in the L-character stand 1. The stand disclosed in a related technology such as JP-A No. 2007-027873 has a shape in which the lower end of the stand also project backward in order to prevent from falling backward, and the stand can hardly be drawn to the wall surface located on the rear face by this projecting portion. However, as the leg portions 122L and 122R are detachable by the L-character stand 1 according to the present embodiment, the L-character stand 1 can be also arranged in a state in which the stand 1 is drawn to the wall surface. Accordingly, the L-character stand 1 can further harmonize with the arrangement space. Moreover, when it is accessed the rear face of the L-character stand 1, for example, at maintenance, falling backward can be prevented by mounting the leg portions 122L and 122R to improve the maintainability.

Moreover, this L-character stand 1 can be disassembled into each component in order to realize easier installation and movement for improvement in the maintainability. Here, the flat-plate display device 2 and the speaker system 3, which are supported by the L-character stand 1, have been enlarged, and this L-character stand 1 is provided with a connecting tool in order to support the above enlarged electronic product, and, besides, to realize disassembling. Hereafter, the above connecting tool will be explained through the disassembling process of the L-character stand 1.

Figure 11:
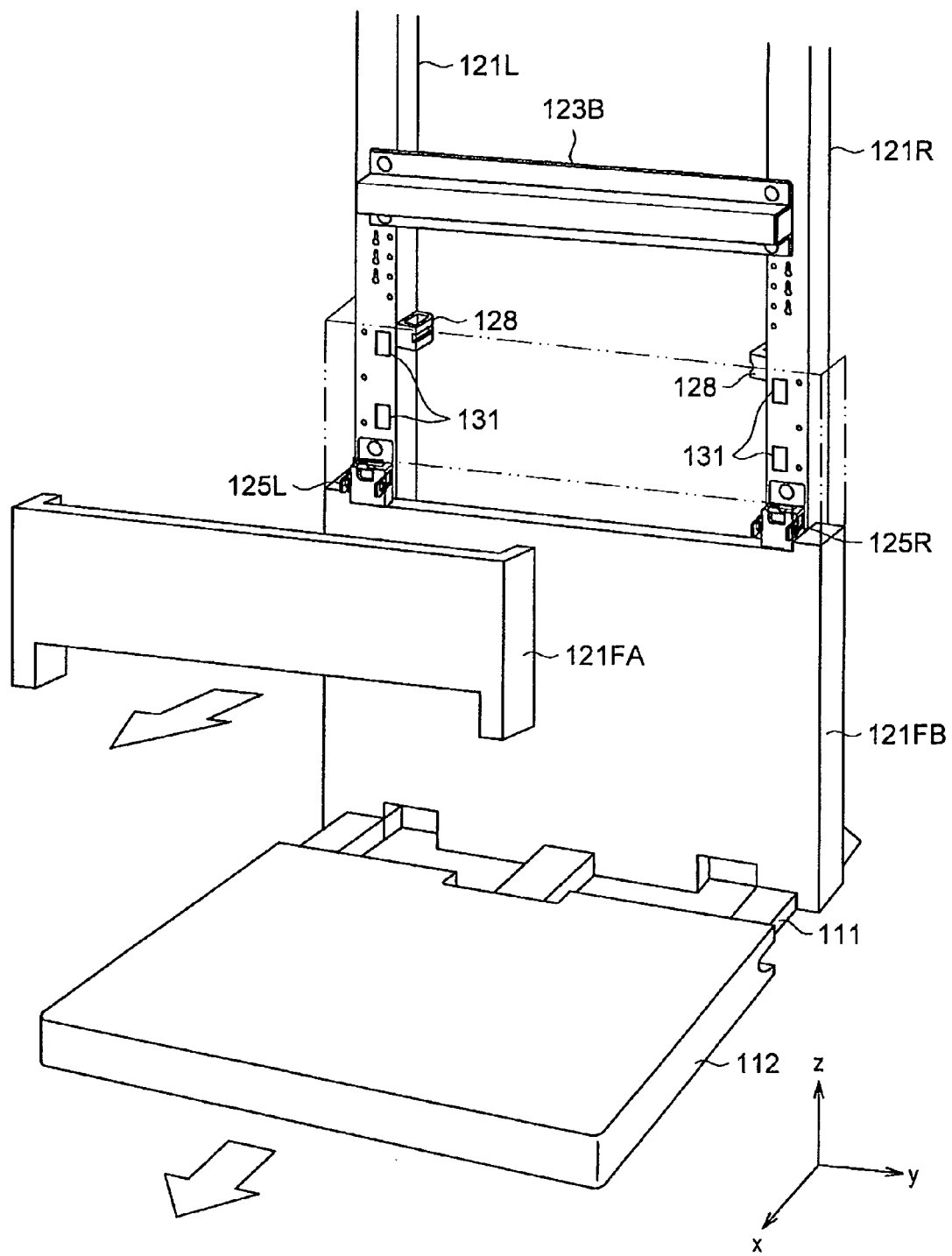
FIG. 11 is an exemplary view for explaining a disassembling process of the L-character stand according to the embodiment.

First, the front cover 121F can be disassembled into an upper front cover 121FA, and a lower front cover 121 FB as shown in FIG. 11. Here, in the present embodiment, the upper front cover 121FA is fixed to the columns 121L and 121R with connection tape 131, and can be easily detached. However, the method for fixing the upper front cover 121FA and lower front cover 121FB is not limited to this example. Moreover, as described above, the base cover 112 can be also detached by sliding forward.

Figure 12:
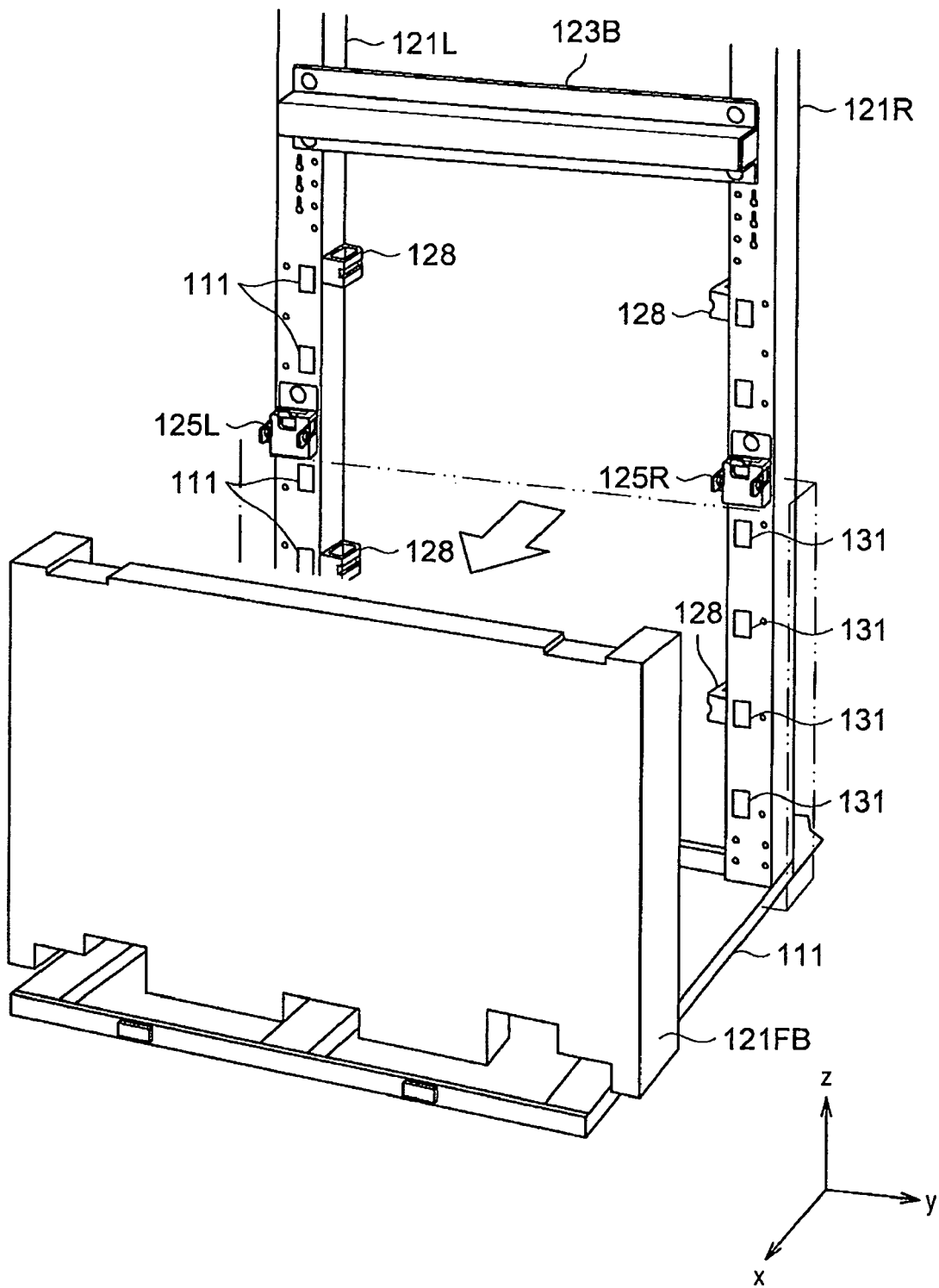
FIG. 12 is an exemplary view for explaining a disassembling process of the L-character stand according to the embodiment.

Then, as shown in FIG. 12, the lower front cover 121FB is also fixed to the columns 121L and 121R with the connection tape 131, and can be easily detached. However the method for fixing the upper front cover 121FA and the lower front cover 121FB is not limited to the above example.

Figure 13:
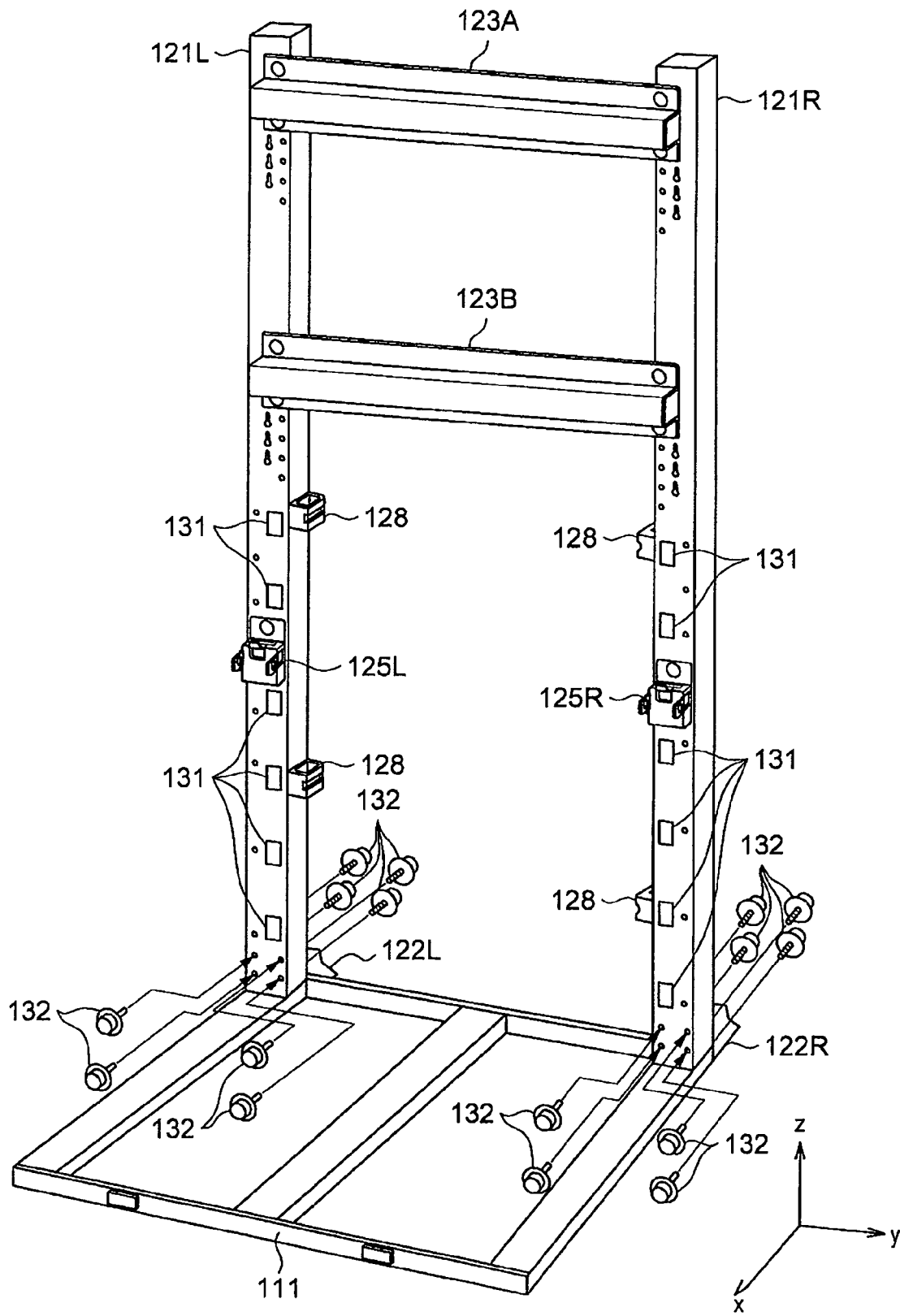
FIG. 13 is an exemplary view for explaining a disassembling process of the L-character stand according to the embodiment.
Figure 14:
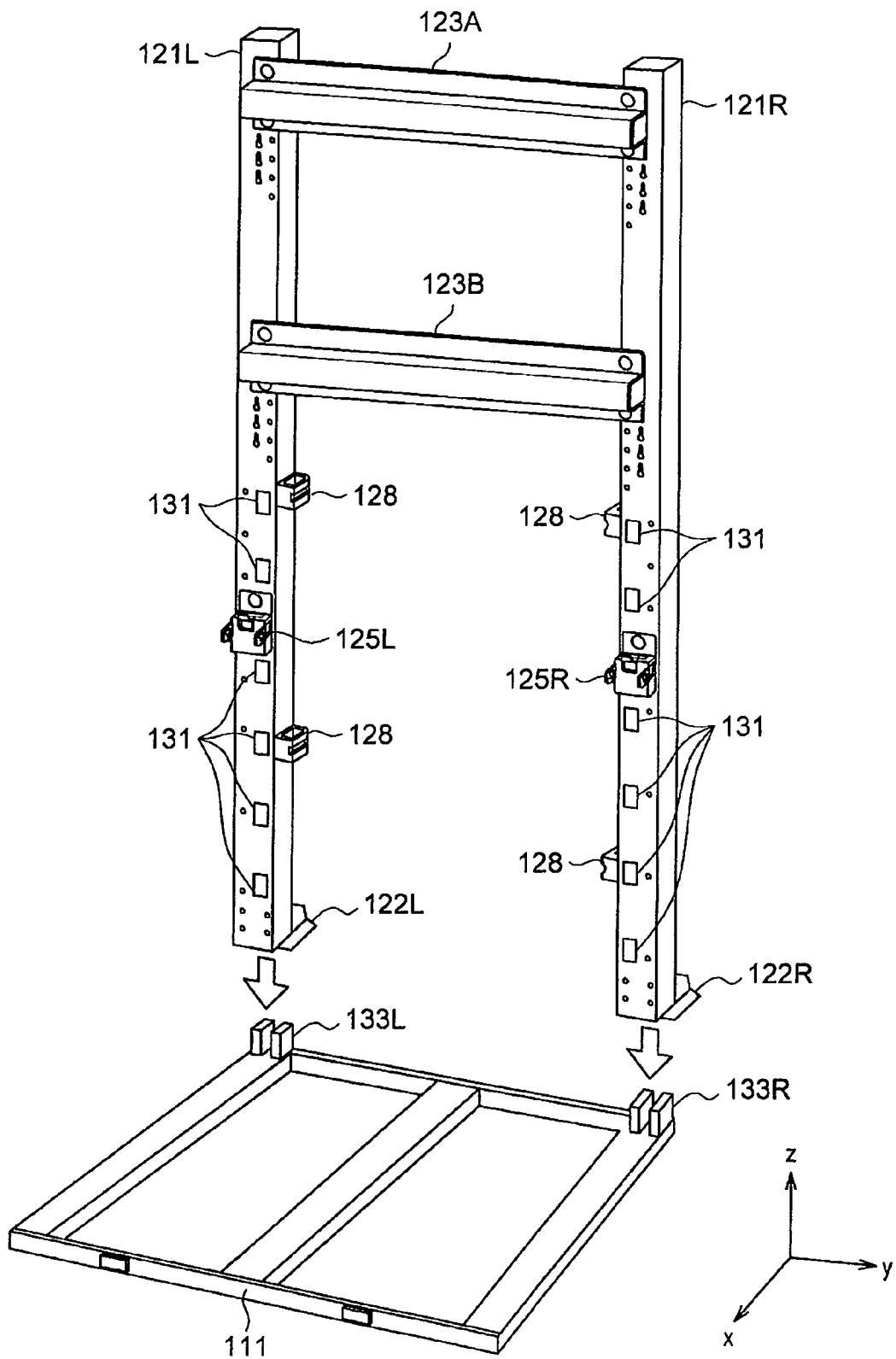
FIG. 14 is an exemplary view for explaining a disassembling process of the L-character stand according to the embodiment.

Moreover, as shown in FIG. 13, the columns 121L and 121R can be connected to the base 111 with screws 132, and, as shown in FIG. 14, can be removed by detaching the screws 132. In this case, the beams 123A and 123B are similarly fixed to the columns 121L and 121R. Accordingly, the beams can be detached by removing the above screws.

Figure 15:
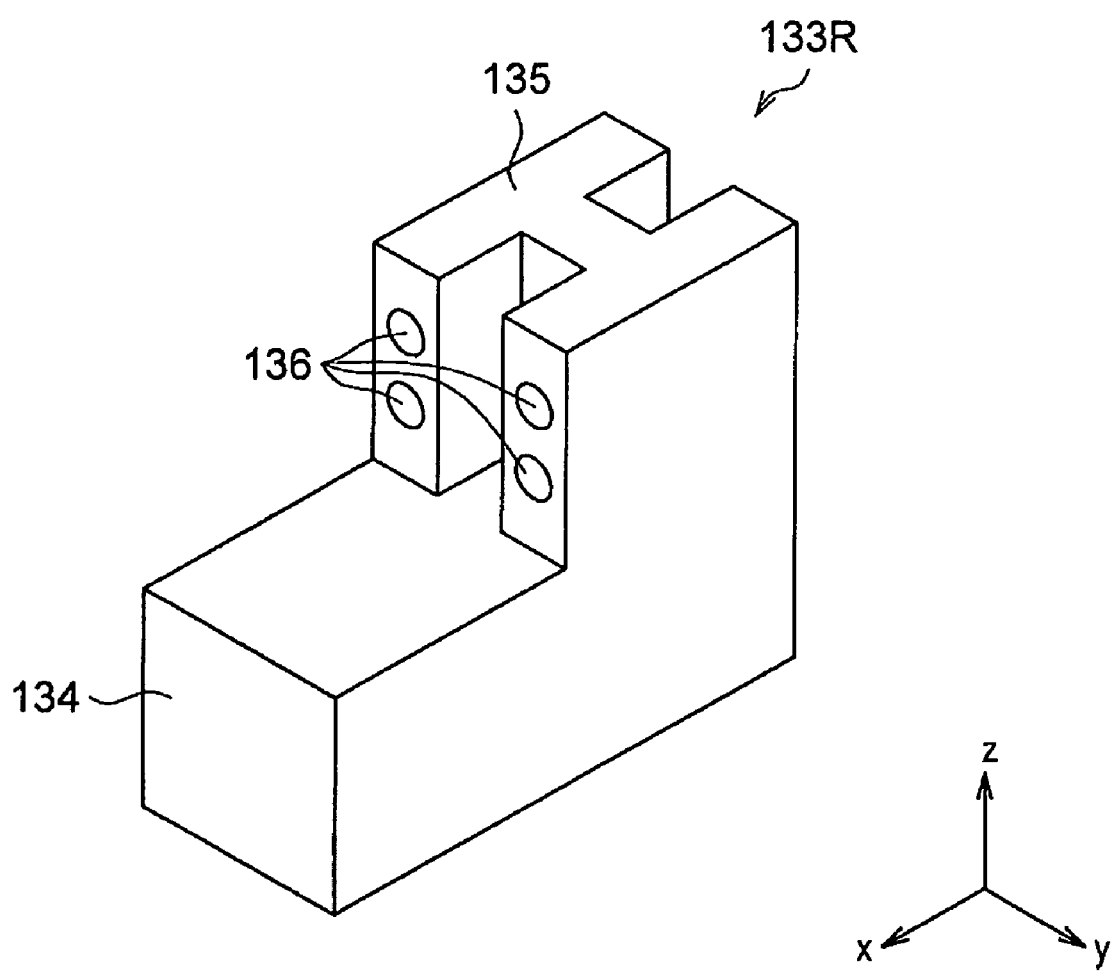
FIG. 15 is an exemplary view for explaining a connecting tool included in the L-character stand according to the embodiment.

Moreover, connecting tools 133L and 133R are arranged between the base 111 and the column 121L. FIG. 15 shows the above connecting tool 133R. Here, the connecting tool 133L is similarly configured as that of the connecting tool 133R. Accordingly, detailed explanation will be eliminated here.

The connecting tool 133R has a horizontal portion 134 extended and formed forward in the horizontal direction, and a vertical portion 135 extended and formed in a direction vertical to the above direction, and when seeing from the side, is formed like an L-character. Then, this horizontal portion 134 is inserted into the base 111 for fixing. That is, the vertical portion 135 of the connecting tool 133R is arranged, projecting upward of the base 111, as shown in FIG. 14. Then, this vertical portion 135 is inserted into the inside of the column 121R. Moreover, holes 136 are formed in the vertical portion 135, and the screws 132 are inserted thereinto for fixing the column 121R.

Moreover, this connecting tool 133R is formed of metal such as aluminum and iron, and the horizontal portion 134 and the vertical portion 135 are made by integral molding. That is, the connecting tool 133R may be molded for example, by cutting out one metallic material as processing, or by integral molding of the horizontal portion 134 and the vertical portion 135, based on molding, for example, by a metal mold casting method like die-cast. Moreover, the connecting tool 133R may be obtained, for example, by a configuration in which the horizontal portion 134 and the vertical portion 135 are formed as one body, respectively, and the horizontal portion 134 and the vertical portion 135 are formed into one body by connecting by welding and the like.

Moreover, the horizontal section of the vertical portion 135 is formed in an H-like shape, as shown in FIG. 15. By the above-described shape as the configuration, weight reduction and material saving can be realized while the strength of the vertical portion 135 is maintained.

As described above, the L-character stand 1 according to the present embodiment can be easily disassembled into components after being assembled once. Here, a stand supporting a general flat-plate display device has been unable, from a view point of the strength, to be disassembled after being assembling once. However, the L-character stand 1 according to the present embodiment has solved the strength issue, and has been able to be disassembled by having the above-described configuration, especially, by having the connecting tools 133R and 133L. As it is possible to disassemble the stand as described above, it becomes easier to move the L-character stand 1, and the maintainability can be improved.

It should be understood by those skilled in the art that various modifications, combinations, sub-combinations and alterations may occur depending on design requirements and other factors insofar as they are within the scope of the appended claims or the equivalents thereof.

The speaker system 3 can be fixed at the first position and the second position by a configuration in which the fixtures 124L and 124R have a plurality of holes A1 to A5 and a hole B, and the fixtures 125L and 125R has the hook 1254, for, example, in the embodiments. However, the present invention is not limited to the examples. There may be, for example, a configuration in which the fixtures 124L and 124R have one or two or more holes the heights of which can be adjusted, and the fixtures 125 L and 125R have a hook 1254 for a first position, and another hook for a second position. Furthermore, there may be a configuration in which the fixtures 124L and 124R have a hook, and the fixtures 125L and 125R have a hole corresponding to the above hook.

Moreover, in the above-described embodiment, there has been explained a case, for example, in which the leg portions 122L and 122R can be detached by detaching the screws 1221 as shown in FIG. 9. However the present invention is not limited to the above described example. For example, these leg portions 122L and 122R can be configured to be accommodated in the columns 121L and 121R, respectively. Furthermore, these leg portions 122L and 122R can be rotatably fixed to the columns 121L and 121R, respectively. As the leg portions 122L and 122R can be detached by detaching, accommodating, and folding by rotation as described above, the L-character stand 1 can be arranged nearer to the wall surface without a space.

What is claimed is:

1. An L-character stand, comprising:
   a column which supports a first electronic product;
   a base connected to the column to form an L-character;
   a first fixture provided on the column; and
   a second fixture provided on a rear face of a second electronic product,
   wherein the first and the second fixtures can be engaged with each other at a first position and at a second position, wherein the first position permits the rear face of the second electronic product to face backward and the second position permits the rear face of the second electronic product to face upward, wherein the first and second fixtures are disengaged with each other in order to switch between the first and second positions.

2. The L-character stand according to claim 1, wherein one of the first or the second fixtures includes a hook, and the other one includes a hole with which the hook can be engaged.

3. The L-character stand according to claim 2, further comprising:
   a front cover covering at least the front face and the right and left side faces of the column, the front cover including a wiring hole configured to hold a wire when the first and second fixtures are engaged with each other at both the first position and the second position.

4. The L-character stand of claim 1, wherein the second position permits an angle of at least 90 degrees to be formed between the rear face of the second electronic product and a front face of the column.

5. An L-character stand, comprising:
   a column supporting an electronic product; and
   a base connected to the column to form an L-character, wherein,
   on the base, a base cover is detachably provided and configured to cover at least the top face and the front face of the base, wherein the sides of the base cover are configured to cover at least the right and the left sides of the base, and wherein at least one of the sides of the base cover includes a wiring hole arranged to accept a wire to permit a wire to pass under the base cover and through the base.

6. The L-character stand according to claim 5, wherein, the base cover may be slidably provided to the base in a first direction toward the front of the column and in a second direction away from the front of the column.

7. The L-character stand according to claim 5, further comprising:
   a front cover which covers at least the front face, and the right and left sides of the column, and is in contact with the base cover at assembly, wherein,
   in the connecting portion between the base cover and the front cover, a wiring hole is opened on at least either of the top face of the base cover, or the front face of the front cover.

8. An L-character stand, comprising:
   columns supporting an electronic product;
   a base connected to the columns to form an L-character shape; and
   a connecting tool which connects the columns to the base, the connecting tool including a vertical portion constructed and arranged to connect to the columns and a horizontal portion constructed and arranged to connect to the base, wherein the vertical portion and the horizontal portion are integrally molded,
   and wherein a horizontal cross-section of the vertical portion is formed in an H-like shape.

* * * * *